Figure 1:
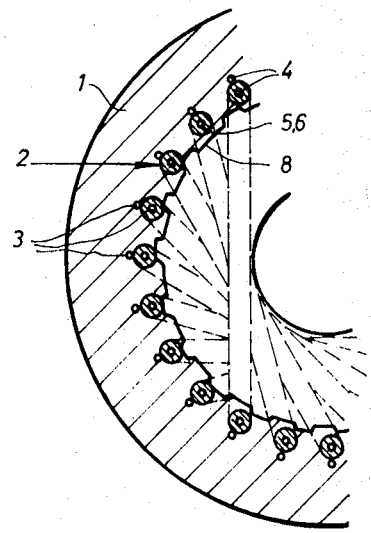

United States Patent

[11] 3,578,057

| [72] | Inventors | Ulrich Knipp<br>Leverkusen;<br>Eckhard Boigk, Leichlingen; Erwin<br>Weinbrenner, Opladen, Germany |
|---|---|---|
| [21] | Appl. No. | 732,155 |
| [22] | Filed | May 27, 1968 |
| [45] | Patented | May 11, 1971 |
| [73] | Assignee | Farbenfabriken Bayer Aktiengesellschaft<br>Leverkusen, Germany |
| [32] | Priority | June 2, 1967 |
| [33] | | Germany |
| [31] | | F52579 |

[54] SYNTHETIC RESIN PNEUMATIC TIRE
3 Claims, 2 Drawing Figs.

[52] U.S. Cl. .................................................... 152/356
[51] Int. Cl. .................................................... B60c 9/02
[50] Field of Search .................................... 152/330, 354, 355, 356

[56] References Cited
UNITED STATES PATENTS

| 2,915,102 | 12/1959 | Alexeff et al. | 152/356 |
| 2,986,191 | 5/1961 | Beckadolph | 152/356 |
| 3,143,155 | 8/1964 | Knox | 152/330 |
| 3,458,373 | 7/1969 | Knipp et al. | 156/125 |

*Primary Examiner*—Arthur L. La Point
*Attorney*—Burgess, Dinklage & Sprung

ABSTRACT: A pneumatic tire made from a synthetic resin is produced using a mold and an annular mold core and has a spacing layer arranged between the windings of a reinforcing insert and the internal surface of the tire.

INVENTORS:
ULRICH KNIPP, ECKHARD BOIGK, ERWIN WEINBRENNER

ATTORNEY

SYNTHETIC RESIN PNEUMATIC TIRE

This invention relates to a pneumatic tire which is capable of withstanding very high internal pressures. More particularly, this invention relates to a pneumatic tire made of polyurethane elastomer and capable of withstanding very high internal pressures.

Heretofore attempts have been made to reinforce large volume synthetic resin tires with woven fabric inserts such as is customary for rubber tires. However, it is an expensive procedure to fix the fabric on the tire core and it has not been possible to thoroughly impregnate the fabric with adhesive to insure the necessary bonding to the tire core. Therefore, it has optionally been proposed to produce tires of this type by laying a reinforcing insert of steel wire or textile yarn on the core with the wire or yarn being wound in successive windings which partially envelop the annular mold core. It has been found, however, that when the tire or tube is inflated from the windings around the reinforcing insert tear away from the material of the tire since they are in direct contact with the internal surface of the tire. The material of the tire does not become sufficiently firmly bonded to the wires or yarn during the molding process to counteract the forces produced upon inflation.

Therefore, it is an object of this invention to provide a pneumatic tire made from synthetic resin and which is devoid of the disadvantages and problems previously mentioned. An additional object of this invention is to provide a novel and improved pneumatic tire made from synthetic resin. A still further object of this invention is to provide a pneumatic tire made from polyurethane elastomers having improved characteristics. A still further object of this invention is to provide a pneumatic tire made from synthetic resin and capable of withstanding very high internal pressures. A further additional object of this invention is to provide a synthetic resin pneumatic tire having more complete and acceptable bonding between the tire material and the reinforcing insert.

Figure 2:
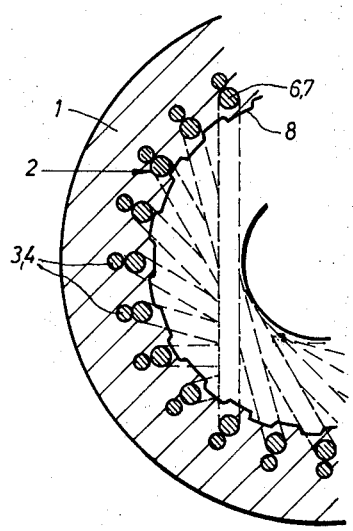

The foregoing objects and others which become apparent from the following description and the accompanying drawings in which FIG. 1 shows a partial sectional view of an embodiment of a tire having a reinforcing insert with a covering of reinforcing wire or yarn and FIG. 2 shows a partial sectional view of another embodiment of a tire of this invention provided with a separate spacing winding, are accomplished in accordance with this invention, generally speaking, by arranging a spacing layer between the windings of the reinforcing insert and the internal surface of a synthetic resin pneumatic tire. More particularly, the objects of this invention are accomplished by providing a pneumatic tire made from the synthetic resin and which is capable of withstanding very high internal pressures and which is produced using a mold and an annular mold core and which further has a reinforcing insert partly enveloping the mold core and wherein there is a spacing layer between the windings of the reinforcing insert and the internal surface of the tire.

From a practical production standpoint, this means that the spacing layer must be inserted between the windings and the core during the winding of the reinforcing insert. As a result, the actual reinforcing wire or yarn is placed further from the internal surface of the tire than previously, and, therefore, in the molding process the material of the tire can be applied in a thicker layer between the reinforcing inset and the core.

According to one embodiment of the invention, the spacing layer consists of a covering of wires or yarn over at least the innermost windings of the reinforcing insert. The most practical and easiest method is to use a wire or yarn which is itself covered by a layer of suitable thickness to serve as the spacing layer. It has been found that, the thicker the covering, the greater will be the surface area over which bonding occurs between the material of the tire and the covering. It has also been found that the wedge of material formed on shaping between the mold core and the covering is correspondingly thicker. One must always, of course, use as the material for covering the threads a material which firmly bonds to the support and which, at the same time, ensures satisfactory bonding to the tire material poured into the mold. According to a particularly preferred embodiment of the invention, one may use for this purpose the same elastomer from which the tire is manufactured, for example, an elastomeric polyurethane or a similar type material, such as natural and synthetical caoutchouc.

According to an alternative embodiment, the spacing layer consists of a winding arranged below the reinforcing insert and comprising at least one layer of yarn or wire. The reinforcing insert is then placed on the spacing winding during production of the tire. The yarn or wire of the spacing winding is also made of a material which can be bonded very securely to the tire material. This spacing layer, in addition to contributing to the strength of the tire, prevents the reinforcing layer from tearing loose from the tire on inflation of the tire or of the tube inside it.

It order to improve the bonding between the reinforcing insert and the tire material, the internal surface of the tire situated below the reinforcing insert is advantageously provided with elevations which may be produced simply by forming depressions at the corresponding positions of the surface of the annular mold core. These elevations allow additional tire material to be introduced between the reinforcing insert and the reinforcing insert.

Referring now to the drawings wherein two embodiments of pneumatic tires made of synthetic resin according to this invention are illustrated, FIG. 1 shows a tire 1 consisting of polyurethane elastomer. The tire 1 is provided with a reinforcing insert indicated generally by 2 which consist of a plurality of individual windings 3, such as, for example, steel wires or textile yarn. The innermost layer of windings 3 arranged toward the center of the tire consists of steel wires 4 which are surrounded by coverings 5 forming a spacing layer indicated generally by 6. The layer arranged above this consists of steel wires 4, without covering, which are bound in the opposite sense. The internal surface of the tire 1 has elevations 8 so that the reinforcing insert 2 is bonded more firmly to the tire core.

In FIG. 2 a tire 1 made of polyurethane elastomer is provided with a reinforcing insert indicated generally by 2 comprising a plurality of individual windings 3 of steel wire 4. A plurality of spacing windings 7 forms a spacing layer indicated generally by 6 below the reinforcing insert 2 in the direction towards the interior of the tire. The yarn or wire of the spacing winding consists of the same material as the tire 1 or a similar material. The internal surface of the tire 1 has elevations 8 so that the reinforcing insert 2 is bonded more firmly to the tire core.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

We claim:

1. A pneumatic tire adapted to withstand a high internal pressure, comprising:
   a. an inflatable, hollow-tire body of a molded synthetic resin,
   b. spaced, reinforcing windings of a continuous filament embedded in said body toroidally about the inner surface thereof, each of said reinforcing windings passing from one side of said tire to the other forming, when viewed along the axis of rotation of said tire, a chord of the circle of the outermost edge of said inner surface, which chord lies within the circle of the bead of said tire, and
   c. a spacing insert disposed between said windings and inner surface, coextensive with each of the inner of said windings, and adapted to prevent said windings from cutting through to said inner surface when said tire is inflated.

2. The tire of claim 1, wherein said filament is steel wire and said spacing insert is a yarn of substantially greater diameter disposed immediately below and contiguous to each of the inner of said steel wires.

3. The tire of claim 2, wherein said synthetic resin is an elastomeric urethane and wherein said internal surface in the areas below said reinforcing insert has molded elevations.